United States Patent
Shiraishi (10) Patent No.: US 10,810,547 B2
(45) Date of Patent: Oct. 20, 2020

(54) INJECTION MOLDING MANAGEMENT SYSTEM

(71) Applicant: FANUC CORPORATION, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 400 days.

(21) Appl. No.: 15/821,888

(22) Filed: Nov. 24, 2017

(65) Prior Publication Data

US 2018/0150796 A1 May 31, 2018

(30) Foreign Application Priority Data

Nov. 25, 2016 (JP) .................................. 2016-228886

(51) Int. Cl.
*G06Q 10/08* (2012.01)
*G05B 19/418* (2006.01)
*G05B 15/02* (2006.01)

(52) U.S. Cl.
CPC ......... *G06Q 10/0875* (2013.01); *G05B 15/02* (2013.01); *G05B 19/41865* (2013.01); *G05B 2219/31431* (2013.01); *G05B 2219/32082* (2013.01); *Y02P 90/20* (2015.11)

(58) Field of Classification Search
CPC ........................ G06Q 10/0875; G06Q 10/087
See application file for complete search history.

(56) References Cited

U.S. PATENT DOCUMENTS

| | | | | |
|---|---|---|---|---|
| 2002/0062314 A1* | 5/2002 | Hisasue | ............... | G06Q 10/087 707/999.01 |
| 2004/0083016 A1* | 4/2004 | Fischer | ................. | B23P 15/007 700/97 |
| 2008/0228554 A1* | 9/2008 | MacDonald | ......... | G06Q 10/087 705/7.31 |
| 2009/0267253 A1* | 10/2009 | Fitzpatrick | ............ | B29C 45/762 264/40.3 |

(Continued)

FOREIGN PATENT DOCUMENTS

| | | |
|---|---|---|
| CN | 102419830 A | 4/2012 |
| CN | 102529016 A | 7/2012 |
| DE | 102004041891 B3 | 4/2006 |

(Continued)

*Primary Examiner* — A. Hunter Wilder
(74) *Attorney, Agent, or Firm* — Hauptman Ham, LLP (57) ABSTRACT

An injection molding management system includes: a molding information storage unit configured to store molding information on the usage of each type of molding material used in forming product molding, for each kind of molding; a remaining product quantity calculator configured to calculate the remaining product quantity of each kind of molding; a total usage calculator configured to calculate the total usage of each type of molding material used in the injection molding machines, based on the molding information of each kind of molding and the remaining product quantity of molding; a stock quantity storage unit configured to store the stock quantity of molding material; and an order quantity calculator configured to calculate the order quantity of each type of molding material, based on the total usage and the stock quantity of the molding material.

18 Claims, 2 Drawing Sheets

(56) References Cited

U.S. PATENT DOCUMENTS

2013/0136384 A1    5/2013  Tsai

FOREIGN PATENT DOCUMENTS

| JP | 63-189554 U   | 12/1988 |
| JP | H02300968 A   | 12/1990 |
| JP | H04135822 A   | 5/1992  |
| JP | H04247922 A   | 9/1992  |
| JP | H0711318 U    | 2/1995  |
| JP | 2002215974 A  | 8/2002  |
| JP | 2002292710 A  | 10/2002 |
| JP | 2003005817 A  | 1/2003  |
| JP | 2003196516 A  | 7/2003  |
| JP | 2004318262 A  | 11/2004 |
| JP | 2005258585 A  | 9/2005  |

* cited by examiner

INJECTION MOLDING MANAGEMENT SYSTEM

CROSS-REFERENCE TO RELATED APPLICATION

This application is based upon and claims the benefit of priority from Japanese Patent Application No. 2016-228886 filed on Nov. 25, 2016, the contents of which are incorporated herein by reference.

BACKGROUND OF THE INVENTION

Field of the Invention

The present invention relates to an injection molding management system for stock control management of molding materials for multiple injection molding machines.

Description of the Related Art

Conventionally, there have been proposed systems that manage the molding materials used in injection molding machines. For example, Japanese Laid-Open Utility Model Publication No. 07-011318 discloses a configuration which gives a warning that the raw material remaining in the injection molding machine has become low. Japanese Laid-Open Patent Publication No. 04-135822 discloses a device for automatically measuring the amount of resin used in an injection molding machine. Further, Japanese Laid-Open Patent Publication No. 04-247922 discloses an injection molding product management system which performs product management of multiple injection molding machines.

SUMMARY OF THE INVENTION

In injection molding, the molding material not only become product molding but also is discarded in the form of a sprue and a runner, by purging before and after molding, as a rejected molding, and for other reasons. In a factory, various kinds of molding are formed by multiple injection molding machines, and the molding materials used also differ depending on the kinds of molding. Therefore, stock control management of molding materials has been difficult.

In the technologies of the aforementioned Japanese Laid-Open Utility Model Publication No. 07-011318 and Japanese Laid-Open Patent Publication No. 04-135822, the remaining amount and the usage amount of molding material of individual injection molding machines can be managed, but the stock control management of molding material for multiple injection molding machines cannot be handled. In the technology described in the above Japanese Laid-Open Patent Publication No. 04-247922, the remaining amount of molding material is displayed by performing product management for multiple injection molding machines, but the technology is not the one that can also handle the order quantity, so that it is impossible to determine the proper order quantity of molding material.

The present invention has been devised to solve the above problems, it is therefore an object of the present invention to provide an injection molding management system that performs stock control management of multiple types of molding material to be used to form a variety of moldings by use of multiple injection molding machines and can calculate the order quantity of molding material.

The aspect of the present invention resides in an injection molding management system for performing stock control management of a plurality of types of molding material used for forming a plurality of kinds of molding in multiple injection molding machines which each form one kind of molding with one or more types of molding material, comprising: a molding information storage unit configured to store molding information on usage of each type of molding material used in forming a molding, for each kind of molding; a remaining product quantity calculator configured to calculate the remaining product quantity of each kind of molding; a total usage calculator configured to calculate total usage of each type of molding material used by the injection molding machines, based on the molding information on each kind of molding and the remaining product quantity of molding; a stock quantity storage unit configured to store the stock quantity of molding material; and an order quantity calculator configured to calculate the order quantity of each type of molding material, based on the total usage and the stock quantity of molding material.

According to the present invention, it is possible to calculate a proper order quantity of molding material.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An injection molding management system according to the present invention will be detailed below by describing preferred embodiments with reference to the accompanying drawings.

First Embodiment

[Configuration of Injection Molding Management System]

Figure 1:
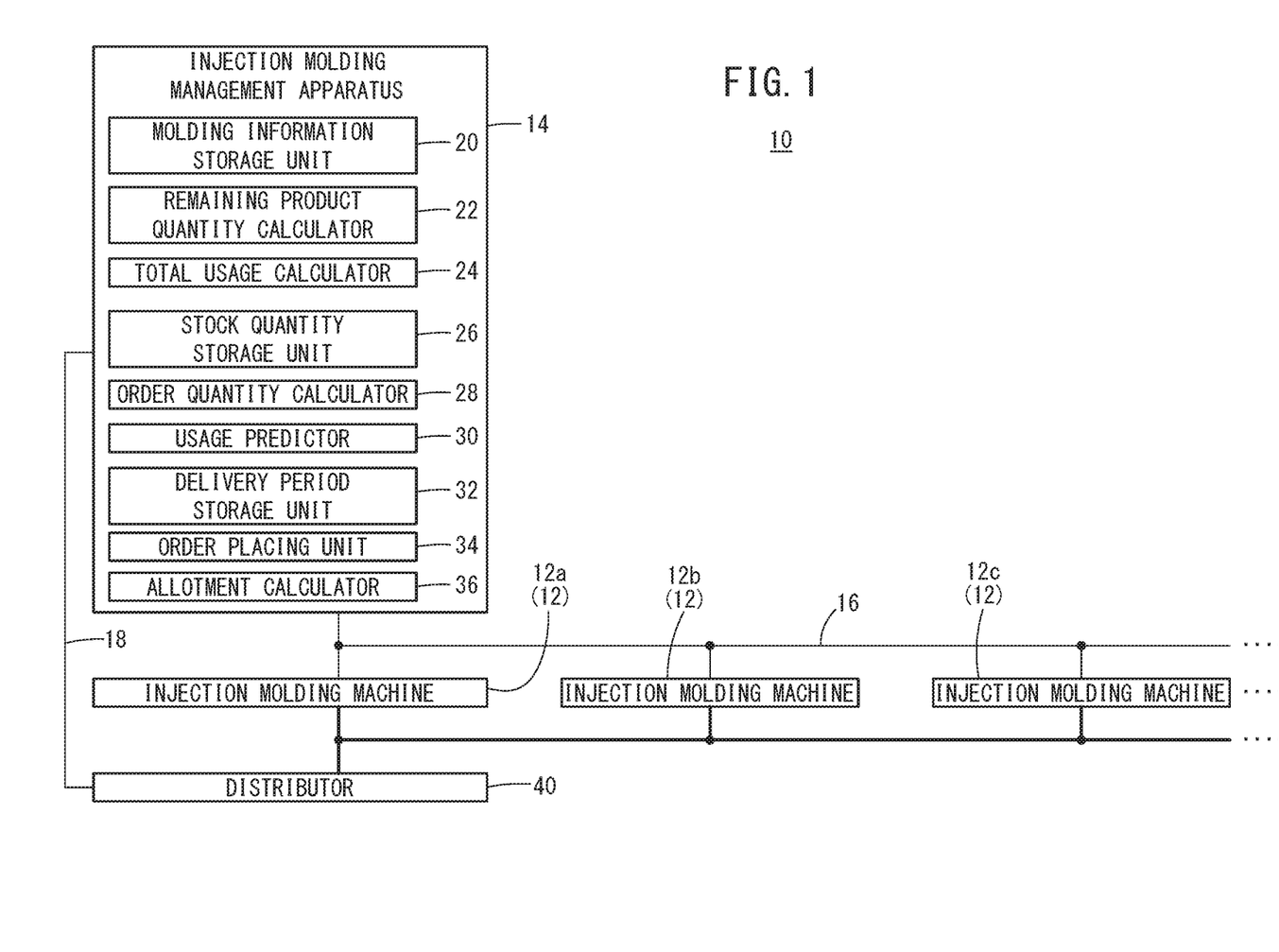
FIG. 1 is a block diagram of an injection molding management system according to a first embodiment.

FIG. 1 is a block diagram of an injection molding management system 10. The injection molding management system 10 performs stock control management of molding materials used in multiple injection molding machines 12a to 12c installed in a factory, for instance. Although three injection molding machines 12a to 12c are shown in FIG. 1, the present embodiment conceives of a scene where dozens or hundreds of injection molding machines 12 are installed in the factory. Hereinafter, in the case where the injection molding machines 12a to 12c in the factory are not particularly specified, the injection molding machines 12a to 12c are simply referred to as injection molding machines 12.

A single injection molding machine 12, to which one mold is attached, produces one kind of molding. With the multiple injection molding machines 12 in the factory, many kinds of moldings are produced. In addition, one injection molding machine 12 can produce different kinds of moldings by exchanging molds. The injection molding machine 12 includes one or multiple injection units (not shown). A single injection unit can inject one type of molding material. That is, one injection molding machine 12 forms one kind of molding with one or multiple molding materials.

For example, a mold #1 is attached to the injection molding machine 12a that produces a molding X out of a molding material a and a molding material b. A mold #2 is attached to the injection molding machine 12b that produces a molding Y out of the molding material a. Further, a mold #3 is attached to the injection molding machine 12c that produces a molding Z out of a molding material c.

[Injection Molding Management Apparatus]

The injection molding management system 10 includes an injection molding management apparatus 14. The injection molding management apparatus 14 is a computer connected with a communication circuit 16 that bidirectionally communicates with each of the injection molding machines 12. The injection molding management apparatus 14 includes a molding information storage unit 20, a remaining product quantity calculator 22, a total usage calculator 24, a stock quantity storage unit 26, an order quantity calculator 28, a usage predictor 30, a delivery period storage unit 32, an order placing unit 34, and an allotment calculator 36.

(Molding Information Storage Unit)

The molding information storage unit 20 stores molding information on the amount of molding material used for molding of every molding. Specifically, the molding information is information on the weight of the molding material of every type used for moldings, sprues, and runners. For example, when the molding X is formed out of the molding material a and the molding material b, the molding information storage unit 20 has stored information on the weight of the molding material a and the weight of the molding material b for the molding X and the weight of the molding material a and the weight of the molding material b for sprues and runners created in forming the molding X. Since the weights of the moldings, sprues, and runners are determined depending on the combination of the mold and the molding material, the molding information storage unit 20 may be configured to store the mold number (#) and information on the molding material used with the mold.

Inasmuch as the same mold is used, moldings of the same kind are produced even if different injection molding machines 12 are used. However, when the same mold is attached to different injection molding machines 12, it is necessary newly to adjust the molding conditions, so that the weight of each type of molding material in sprues and runners may slightly differ depending on the combination of the individual injection molding machine 12 and the mold. For this reason, under the condition that the mold #1 is used only by a specific injection molding machine 12, the molding information storage unit 20 may store the information on the weights of the molding X, sprues, and runners molded by the injection molding machine 12 in combination with the mold #1.

Further, the molding information storage unit 20 may have information on the mold cycle time for every kind of the moldings as the molding information. The mold cycle time is the time period of a single shot of the injection molding machine 12. Based on the mold cycle time, it is possible to determine the product quantity of the moldings per day, for example.

Further, the molding information storage unit 20 may have information on purge conditions for each type of molding material. The purge conditions may include, for example, the weight of the molding material discharged per one automatic purge, the number of automatic purges performed before start of and after end of the production by the injection molding machine 12, the amount of the molding material discharged in one revolution of a screw in a manual purge, coefficients for correcting the amount of the molding material discharged by a purge, and the like. The weight of the molding material discharged in one automatic purge is defined as the weight of the molding material discharged by rotating the screw of the injection unit (not shown) to retract the screw and then advancing the screw without rotation of the screw. The weight of the molding material discharged by the automatic purge can be obtained by multiplying the amount of the molding material discharged in one automatic purge with the number of automatic purges. The weight of the molding material discharged by the manual purge can be determined by multiplying the amount of the molding material discharged in one revolution of the screw in the manual purge with a predetermined number of revolutions.

The coefficients for collecting the amount of the molding material discharged by purging (hereinafter simply referred to as correction coefficients) are quantities set according to the rotational rate of the screw. The correction coefficients can be obtained empirically by measuring in advance the amount of the molding material discharged at different rotational rates of the screw. The weight of the molding material discharged per one automatic purge and the amount of the molding material discharged per one revolution of the screw in the manual purge may be set taking account of the correction coefficients.

One example when the correction coefficient becomes greater than 1 is, for example, a case where a molding is formed using a type of molding material having a high surface friction coefficient. In this case, as the rotational rate of the screw increases, plasticization of the molding material is promoted by shear heat generation from the molding material. On the other hand, one example when the correction coefficient becomes smaller than 1 is, for example, a case where a molding is formed using a type of molding material having a low surface friction coefficient. In this case, even if the rotational rate of the screw increases, the thermal energy supplied to the molding material does not increase so much so that the efficiency of plasticizing of the molding material lowers. Other than the screw rotation rate, the correction coefficient may also be set based on the retraction speed or advancing speed of the screw in the automatic purge, the retreat distance of the screw, and/or the set temperature of an unillustrated nozzle heater.

Further, the molding information storage unit 20 may include data on the yield rate of the good part (non-defective part). For example, if the yield rate is 0.999, it means that one shot of 1000 shots is the defective part. In addition to the above information, the molding information storage unit 20 may be adapted to store information on the scheduled product quantity and completed product quantity for each kind of moldings, the stop time for each injection molding machine 12, and the number of shots per day, resin names and grades of molding material, etc.

(Remaining Product Quantity Calculator)

The remaining product quantity calculator 22 calculates, for each kind of molding, a not-yet-produced quantity of product. A value obtained by subtracting the number of moldings already produced from the planned product quantity stored in the molding information storage unit 20 is set as the remaining product quantity.

(Total Usage Calculator)

The total usage calculator 24, based on the molding information on each kind of the moldings stored in the molding information storage unit 20 and the remaining product quantity of each kind of the moldings calculated by the remaining product quantity calculator 22, calculates the total usage of each type of molding material to be used by the multiple injection molding machines 12 in the whole factory.

The processes in which the molding material is consumed by each injection molding machine 12 mainly include an automatic operation process, an automatic purge process, and a manual purge process. The automatic operation process is a process of forming moldings. The automatic purge process is a process of automatically discharging the molding material remaining in the nozzle before and after the automatic operation process. The manual purge process is a process of manually discharging the molding material remaining in the nozzle before and after the automatic operation process.

For example, the weights of the molding material a and b used by the injection molding machine 12*a* in the automatic operation process are given by the following expressions:

(Weight of molding material *a* used in automatic operation process)=(Weight of molding material *a* in molding *X*, sprues, runners)×(Remaining product quantity of molding *X*); and (Weight of molding material *b* used in automatic operation process)=(Weight of molding material *b* in molding *X*, sprues, runners)×(Remaining product quantity of molding *X*).

The weights of the molding materials a and b used (discharged) by the injection molding machine 12*a* in the automatic purge process are given by the following expressions:

(Weight of molding material *a* discharged in the automatic purge process)=(Amount of molding material *a* discharged per one automatic purge)×(Number of times automatic purge is performed)×(Number of times automatic purge process is performed); and (Weight of molding material *b* discharged in automatic purge process)=(Amount of molding material *b* discharged per one automatic purge)×(Number of times automatic purge is performed)×(Number of times automatic purge process is performed).

Further, the weight of the molding material a and the weight of the molding material b used (discharged) by the injection molding machine 12*a* in the manual purge process are given by the following expressions:

(Weight of molding material *a* discharged in manual purge process)=(Amount of molding material *a* discharged per one revolution of screw)×(Set number of revolutions of screw)×(Number of times manual purge process is performed); and (Weight of molding material *b* discharged in manual purge process)=(Amount of molding material *b* discharged per one revolution of screw)×(Set number of revolutions of screw)×(Number of times manual purge process is performed).

Here, the number of times the automatic purge process is performed and the number of times the manual purge process is performed are set according to the automatic operation conditions and the purge conditions of the injection molding machine 12*a*. For example, when the injection molding machine 12*a* is driven for 24 hours, the automatic purge process and the manual purge process are each performed twice; before and after molding X is formed. Further, for example, in the case where the injection molding machine 12*a* is started every morning and stopped at every night, the automatic purge and the manual purge are performed twice daily×production days. There are cases in which only the automatic purge is performed without any manual purge.

The total usage calculator 24 calculates the total weight of the molding material a and the total of the molding material b used by the injection molding machine 12*a* in the automatic operation process, the automatic purge process, and the manual purge process and holds the totals as the weight of the molding material a and the weight of the molding material b used by the injection molding machine 12*a*.

Similarly, regarding the injection molding machines 12*b* and 12*c*, the total usage calculator 24 calculates and holds the total usage of the molding material a used by the injection molding machine 12*b* and the weight of the molding material c used by the injection molding machine 12*c*. The total usage calculator 24 calculates the weight of every type of molding material used by each injection molding machine 12 in the factory. Then, the total usage calculator 24 calculates a separate total for each type of molding material used by all the injection molding machines 12 as a separate total usage for each type of molding material. The separate total usage of each of the molding materials a, b, c is obtained by the following expressions:—.

(Total usage of molding material *a*)=(Usage of molding material *a* in injection molding machine 12*a*)+(Usage of molding material *a* in injection molding machine 12*b*)+ . . . ;

(Total usage of molding material *b*)=(Usage of molding material *b* in injection molding machine 12*a*)+ . . . ; and (Total usage of molding material *c*)=(Usage of molding material *c* in injection molding machine 12*c*)+ . . . , .

(Stock Quantity Storage Unit)

The stock quantity storage unit 26 stores the stock quantity of every type of molding material currently stocked in the factory.

(Order Quantity Calculator)

The order quantity calculator 28 calculates, as an order quantity of each type of molding material, the amount obtained by subtracting the stock quantity of each type of molding material stored in the stock quantity storage unit 26 from the separate total usage of each type of molding material calculated by the total usage calculator 24.

(Usage Predictor)

The usage predictor 30 predicts a daily usage of each type of molding material to be used by the multiple injection molding machines 12 of the entire factory. The usage of each type of molding material is different every day. Therefore, the usage predictor 30 is configured to predict the daily usage of each type of molding material. When the usage of the molding material of each type changes slightly, the usage predictor 30 may be configured to predict a daily average usage within a predetermined period of time.

(Delivery Period Storage Unit)

The delivery period storage unit 32 stores the number of days delivery of each type of molding material takes from when the molding material is ordered. When the same type of molding material is ordered to multiple suppliers, if the numbers of days for delivery differ depending on the suppliers, the delivery period storage unit 32 may store the number of days delivery by each of the suppliers takes.

(Order Placing Unit)

The order placing unit 34 outputs ordering commands for different types of molding material based on the order quantity of molding material calculated by the order quantity calculator 28. The order placing unit 34 outputs an ordering command at such timing that the molding material will be delivered before the stock of the molding material falls below the minimum stock quantity. For example, if the current stock quantity of the molding material a is S, the minimum stock quantity of the molding material a is S', the predicted daily usage of the molding material a is C, and the number of days delivery of the molding material a takes is L, the date (D days after) at which the order placing unit 34 should output the ordering command of the molding material a can be given by the expression below. Here, for the sake of simplicity, it is assumed that the predicted daily usage C of the molding material a is constant.

$$D=(S-S')/C-L$$

The order placing unit 34 may issue ordering commands of multiple types of molding material so that the ordered molding material of which the quantity is calculated by the order quantity calculator 28 may be delivered at once, or may be divided to multiple parts and delivered every two days, for example. Even if the multiple types of molding material are divided and delivered at intervals, it is necessary to schedule the delivery dates so that the stock of each type of molding material will not fall below the minimum stock quantity. The minimum stock quantity of each type of molding material is set so that the molding material will not be short even when the usage of the molding material increases due to a decrease in the yield rate of the good part or any other reason.

The allotment calculator 36 calculates the allotment of every type of molding material to be distributed to each injection molding machine 12 according to the usage of the molding material used by each injection molding machine 12. Based on the allotments calculated by the allotment calculator 36, a distributor 40, which is described later, distributes the molding material to individual injection molding machines 12.

[Distributor]

The injection molding management system 10 further includes a distributor 40. The distributor 40 is connected to a communication circuit 18 that mutually communicates with the injection molding management apparatus 14. The distributor 40 dries the delivered molding material in an unillustrated drying chamber and then distributes the molding material to each of the injection molding machines 12 by use of a hopper loader or the like.

[Method of Calculating Usage of Molding Material]

A method of calculating the usage of molding material in each injection molding machine 12 will be described with specific examples. Here, calculation of the amount of molding material c used by the injection molding machine 12c is described as an example.

The following information is given as molding information on the molding Z.

Mold to be used: mold #3
Molding material: molding material c
Weight of the molding material c in moldings Z:
    100 [g]
Weight of the molding material c in sprues and runners:
    50 [g]
Mold cycle time: 15 seconds
Driving condition of the injection molding machine 12c:
    12 hours driving per day
Good part rate: 0.999
Amount of molding material c discharged per one automatic purge:
    200 [g]

Number of automatic purges:
    20 times (10 times before production starts, 10 times after production ends)
Scheduled number of products: 100,000 pieces
Completed number of products: 0 piece From the above molding information, the amount of molding material c used by the injection molding machine 12c is calculated as follows.
Remaining product quantity: 100,000 pieces
Product quantity of molding X per day:

$$2{,}880 \text{ pieces}=60 \text{ sec.}\times 60 \text{ min.}\times 12 \text{ hours}/15 \text{ sec.}$$

Days for molding: 35 days (rounded up to the whole number)≈100,000 pieces/2,880 pieces
Total weight of molding material c in the molding X, sprues, and runners: 15,015 [kg]≈100,000 pieces×(100 [g]+50 [g])/0.999
Amount of molding material c discharged in purging:

$$140 \text{ [kg]}=200 \text{ [g]}\times 20 \text{ times}\times 35 \text{ days}$$

Accordingly, the usage of molding material c in the injection molding machine 12c is 15,155 [kg] (=15,015 [kg]+140 [kg]).

Variational Example

Figure 2:
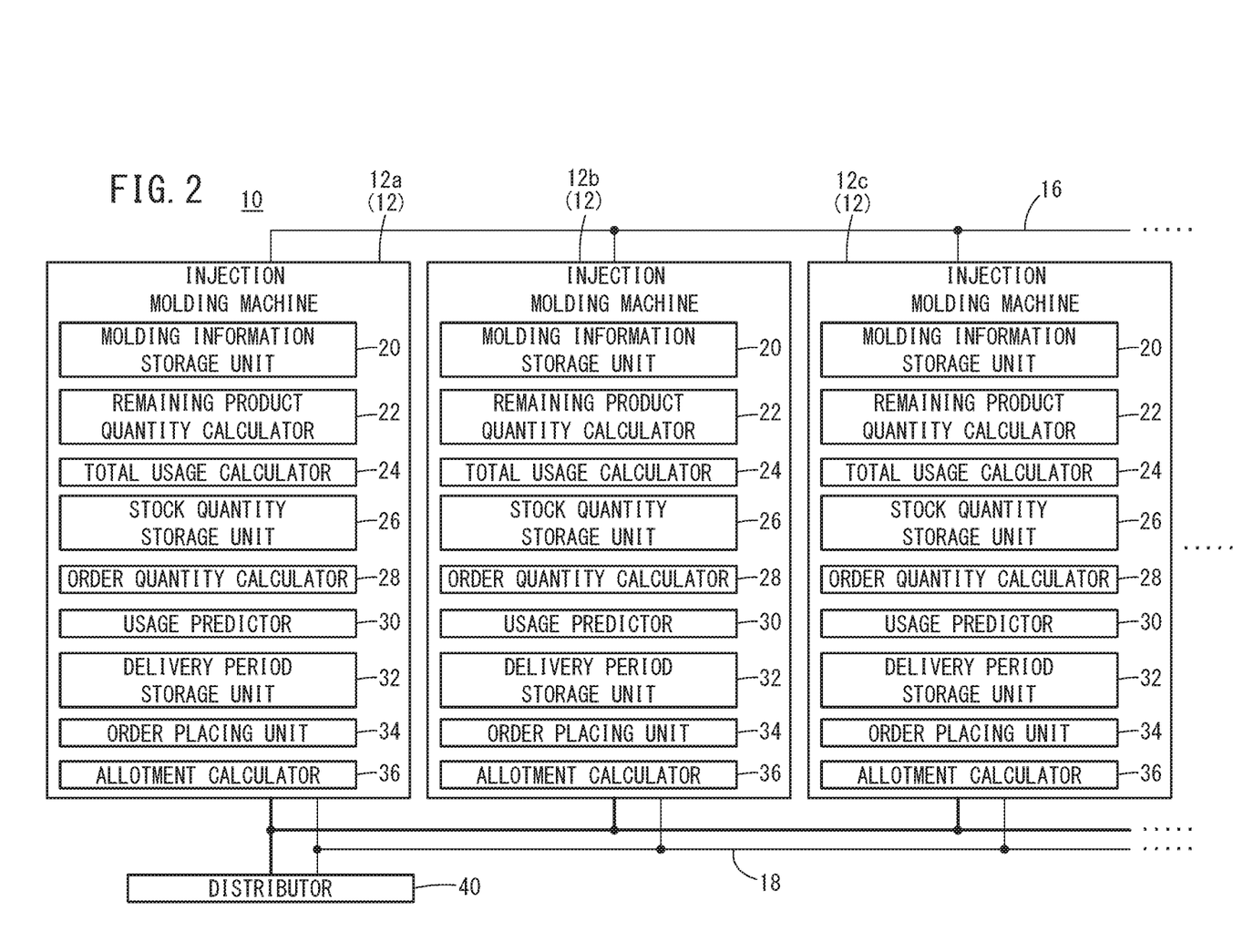
FIG. 2 is a block diagram of an injection molding management system according to a variational example.

FIG. 2 is a block diagram of an injection molding management system 10 according to a variational example. In the first embodiment, the injection molding management apparatus 14 includes a molding information storage unit 20, a remaining product quantity calculator 22, a total usage calculator 24, a stock quantity storage unit 26, an order quantity calculator 28, a usage predictor 30, a delivery period storage unit 32, an order placing unit 34, and an allotment calculator 36. Instead of the configuration above, without the injection molding management apparatus 14, each injection molding machine 12 may be provided with the molding information storage unit 20, the remaining product quantity calculator 22, the total usage calculator 24, the stock quantity storage unit 26, the order quantity calculator 28, the usage predictor 30, the delivery period storage unit 32, the order placing unit 34, and the allotment calculator 36. Here, each injection molding machine 12 is connected to a communication circuit 16 that enables mutual communication with other injection molding machines 12. In addition, each injection molding machine 12 is connected to a communication circuit 18 that mutually communicates with a distributor 40.

In this case, the multiple injection molding machines 12 in the factory may each perform stock control management of the molding material. Alternatively, it is possible to provide such a configuration that only a particular injection molding machine 12 is adapted to perform stock control management of molding material under normal conditions, and when a problem has took place in the injection molding machine 12, another injection molding machine 12 may perform stock control management of molding material. Further, for example, the injection molding machine 12b is configured to store the molding information on molding Y being formed by means of the mold #2, and when the injection molding machine 12c starts to form molding Y using the mold #2 taken from the machine 12b, the molding information on the molding Y may be shared between the injection molding machines 12b and 12c.

Moreover, while the injection molding management apparatus 14 remains, all or some of injection molding machines 12 may also include all or some of the molding information storage unit 20, the remaining product quantity calculator 22, the total usage calculator 24, the stock quantity storage unit 26, the order quantity calculator 28, the usage predictor 30, the delivery period storage unit 32, the order placing unit 34, and the allotment calculator 36. While the injection molding management apparatus 14 performs stock control management of molding material under normal conditions, the configuration above enables each injection molding machine 12 to perform stock control management of molding material once some problems occur in the injection molding management apparatus 14. Alternatively, when part of the processing to be performed by the injection molding management apparatus 14 is performed by the injection molding machines 12, it is possible to efficiently distribute the processing, hence to reduce the loads of processing.

[Operation and Effect]

The injection molding management system 10 of the present embodiment includes, for example, a large number of injection molding machines 12 installed in one factory and performs stock control management of molding material used by each injection molding machine 12. In the factory, various kinds of moldings are formed by the large number of injection molding machines 12. A different type of molding material is used for a different molding. Also, since each injection molding machine 12 produces a molding in different timing, the usage of molding material is different from machine to machine. For this reason, it is important to perform stock control management of molding material. However, when molding material is ordered more than needed to avoid the risk of shortage of the molding material, the molding material is overstocked.

To deal with this situation, in one embodiment of the present invention, an injection molding management system 10 for performing stock control management of a plurality of types of molding material used for forming multiple kinds of molding in multiple injection molding machines 12 which each form one kind of molding with one or more types of molding material, includes: a molding information storage unit 20 configured to store, for each kind of moldings, molding information on the usage of each type of molding material used in forming the moldings; a remaining product quantity calculator 22 configured to calculate the remaining product quantity of the moldings of each kind; a total usage calculator 24 configured to calculate the total usage of each type of the molding material used in the multiple injection molding machines, based on the molding information on the moldings of each kind and the remaining product quantity of the moldings; a stock quantity storage unit 26 configured to store the stock quantity of molding material; and an order quantity calculator 28 configured to calculate the order quantity of each type of molding material, based on the total usage and the stock quantity of each type of molding material.

Since the order quantity of each type of molding material is calculated from the total usage and the stock quantity of each type of the molding material, it is possible to secure the necessary amount of stock for producing moldings while overstock of the molding material is curbed.

Furthermore, the molding information storage unit 20 stores, for each kind of moldings, the weight of each type of molding material for the moldings, sprues, and runners, as the molding information. Most of the molding material becomes moldings, sprues, and runners after molded. The information on the weight of each type of molding material used for the moldings, sprues, and runners enables exact calculation of the total usage of each type of molding material.

Further, in this embodiment, the molding information storage unit 20 stores, as the molding information, at least one of the mold cycle time for each kind of the moldings, purge condition for each type of molding material, and the good part rate in the moldings. The molding material not only becomes the moldings, sprues, and runners, but also is discharged by the purging after being molded. Further, failures in molding are inevitable. This configuration enables more precise calculation of the total usage of each type of molding material in consideration of the amount of molding material discharged by the purging and the amount of molding material consumed as the defective part.

Furthermore, in this embodiment, the molding information storage unit 20 includes a correction coefficient for the discharge amount of molding material as the purge condition for each type of molding material. The discharge amount of the molding material in the purge process varies depending on the number of rotations of the screw and other reasons. Provision of a correction coefficient for correcting the discharge amount of molding material in the purge process enables more exact calculation of the discharge amount of molding material.

Furthermore, the present embodiment further includes an order placing unit 34 configured to issue an ordering command of each type of molding material, based on the order quantity of the molding material calculated by the order quantity calculator 28. This makes it possible to order the molding material automatically and hence reduce the burden on a person in charge of stock control management of molding material and also suppress order mistakes of molding material.

Further, the present embodiment further includes: a usage predictor 30 configured to predict the daily usage of each type of molding material used by the multiple injection molding machines 12, based on the remaining product quantity, the mold cycle time, and the molding information of each kind of moldings; and a delivery period storage unit 32 configured to store the number of days required for delivery of each type of molding material from the time of ordering the molding material until the delivery of the molding material. In this arrangement, the order placing unit 34 is configured to calculate the date on which the stock quantity of the molding material will reach the minimum stock quantity (a predetermined amount), based on the predicted daily usage of each type of molding material and output the ordering command which places an order by the number of days for delivery before the date on which the stock quantity of the molding material reaches the minimum stock quantity (the predetermined amount).

This configuration makes it possible to always keep the stock of each type of molding material in an amount equal to or greater than the minimum stock quantity, hence avoid shortage of molding material even if a certain type of molding material is much consumed by some of injection molding machines 12 due to a decrease in the good part rate in the molding.

Further, the present embodiment further includes: a usage predictor 30 configured to predict the average daily usage of each type of molding material used within a predetermined duration by the multiple injection molding machines 12, based on the remaining product quantity, the mold cycle time, and the molding information of the moldings of each kind; and a delivery period storage unit 32 configured to store the number of days required for delivery of each type of molding material from the time of ordering the molding material until the delivery of molding material. In this arrangement, the order placing unit 34 is configured to calculate the date on which the stock quantity of the molding material will reach the minimum stock quantity (a predetermined amount), based on the predicted average daily usage of each type of molding material and output the ordering command of placing an order by the number of days for delivery before the date on which the stock quantity of the molding material reaches the minimum stock quantity (the predetermined amount).

The configuration above makes it possible to always keep the stock of each type of molding material in an amount equal to or greater than the minimum stock quantity, hence avoid shortage of molding material even if a certain type of molding material is much consumed by some of injection molding machines 12 due to a decrease in the good part rate in molding. Further, since the usage predictor 30 uses the average usage of each type of molding material within the predetermined period, it is possible to reduce the processing load of the injection molding management apparatus 14 as compared to the case where the daily usage is calculated.

Further, the present embodiment further includes: an allotment calculator 36 configured to calculate the allotments of each type of molding material to the individual injection molding machines 12 in accordance with the usage of the molding material used by each of the injection molding machines 12; and a distributor 40 configured to distribute the molding material to each of the injection molding machines 12 in accordance with the allotments calculated by the allotment calculator 36. This configuration makes it possible to automatically distribute molding material required by each of injection molding machines 12.

The present embodiment further includes a communication circuit (communication unit) 16 configured to enable the injection molding machines 12 to communicate with each other. The injection molding machines 12 each include at least one of the molding information storage unit 20, the remaining product quantity calculator 22, the total usage calculator 24, the stock quantity storage unit 26, and the order quantity calculator 28. With this configuration, information such as molding information can be shared between injection molding machines 12 and even when a failure occurs in some of the injection molding machines 12, stock control management of molding material can be done without hindrance.

OTHER EMBODIMENTS

Although the present invention has been described based on the first embodiment, the specific configuration of the invention is not limited to the above embodiment, but changes in design and the like without departing from the gist of the present invention should also be included in the present invention.

The first embodiment was described by giving an example in which one injection molding management apparatus 14 is installed in the factory. However, it is possible to construct a system in which, for example, the injection molding machines 12 in the factory are divided into groups and the injection molding machines 12 belonging to the same group are installed in the same area, each area including one injection molding management apparatus 14. The injection molding management apparatus 14 in each area may be configured to place orders of molding material, or orders of the entire factory may be placed by totaling the order quantity of molding material calculated by the individual injection molding management apparatuses 14 of each area.

In the first embodiment, though the distributor 40 directly distributes molding material to each of the injection molding machines 12, the molding material may be once allotted to each area, dried therein, and then the molding material may be distributed to each of injection molding machines 12 by an unillustrated distributor.

What is claimed is:

1. An injection molding management system for performing stock control management of a plurality of types of molding material comprising at least molding materials 1, 2, and 3 used for forming a plurality of kinds of molding with a plurality of injection molding machines comprising at least molding machines 1, 2, and 3 which each form one kind of molding with one or more types of molding material, the injection molding management system comprising at least one processor configured to execute the steps of:

storing, for each kind of molding, molding information on usage of each type of molding material used in forming a molding;

calculating a remaining product quantity of each kind of molding;

calculating a total usage of each type of molding material used by the injection molding machines, based on the remaining product quantity and the molding information of each kind of molding remaining;

storing a stock quantity of molding material;

calculating an order quantity of each type of molding material, based on the total usage and the stock quantity of each type of molding material; and issuing an ordering command of each type of molding material, based on the order quantity of molding material calculated, wherein calculating the total usage of each type of molding material comprises calculating a total usage of each of the molding materials 1, 2, and 3 for each of the injection molding machines 1, 2, and 3 using the below expressions (I)-(III):

(Total usage of molding material 1)=(Usage of molding material 1 in injection molding machine 1)+(Usage of molding material 1 in injection molding machine 2)+(Usage of molding material 1 in injection molding machine 3);　　(I)

(Total usage of molding material 2)=(Usage of molding material 2 in injection molding machine 1)+(Usage of molding material 2 in injection molding machine 2)+(Usage of molding material 2 in injection molding machine 3); and　　(II)

(Total usage of molding material 3)=(Usage of molding material 3 in injection molding machine 1)+(Usage of molding material 3 in injection molding machine 2)+(Usage of molding material 3 in injection molding machine 3).　　(III)

2. The injection molding management system according to claim 1, wherein the molding information storage unit stores, for each kind of molding, weight of each type of molding material of the molding, a sprue, and a runner, as the molding information.

3. The injection molding management system according to claim 2, wherein the molding information storage unit stores, as the molding information, at least one of a mold cycle time for each kind of molding, a purge condition for each type of molding material, or a good part rate in forming the molding.

4. The injection molding management system according to claim 3, wherein the molding information storage unit includes, as the purge condition for each type of molding material, a correction coefficient for the discharge amount of molding material.

5. The injection molding management system according to claim 1, further comprising:
- a usage predictor configured to predict daily usage of each type of molding material used by the injection molding machines, based on the remaining product quantity, a mold cycle time, and the molding information of each kind of the moldings; and
- a delivery period storage unit configured to store, for each type of molding material, the number of days required for delivery of each type of molding material from when the molding material is ordered,
- wherein the order placing unit is configured to calculate a date on which the stock quantity of molding material reaches a predetermined amount, based on the predicted daily usage of each type of molding material and output the ordering command of placing an order by the number of days for delivery before the date on which the stock quantity of molding material reaches the predetermined amount.

6. The injection molding management system according to claim 1, further comprising:
- a usage predictor configured to predict average daily usage of each type of the molding material used within a predetermined duration by the multiple injection molding machines, based on the remaining product quantity, a mold cycle time, and the molding information of each kind of the moldings; and
- a delivery period storage unit configured to store the number of days required for delivery of each type of the molding material from when the molding material is ordered,
- wherein the order placing unit is configured to calculate a date on which the stock quantity of molding material reaches a predetermined amount, based on the predicted average daily usage of each type of molding material and output the ordering command of placing an order by the number of days for delivery before the date on which the stock quantity of molding material reaches the predetermined amount.

7. The injection molding management system according to claim 1, further comprising:
- an allotment calculator configured to calculate an allotment of each type of the molding material to the injection molding machines in accordance with the usage of the molding material used by each of the injection molding machines; and
- a distributor configured to distribute the molding material to the injection molding machines in accordance with the allotments calculated by the allotment calculator.

8. The injection molding management system according to claim 1, further comprising a communication unit configured to enable the injection molding machines to communicate with each other, wherein at least one of the injection molding machines includes, at least, one of the molding information storage unit, the remaining product quantity calculator, the total usage calculator, the stock quantity storage unit, or the order quantity calculator.

9. The injection molding management system according to claim 5, wherein the order placing unit is further configured to calculate the date using the equation $D=(S-S')/C-L$ where the stock quantity of molding material is S, a minimum stock quantity of molding material is S', the predicted daily usage is C, the number of days for delivery of the molding material is L, and D is the number of days for delivery before the date on which the stock quantity of molding material reaches the predetermined amount.

10. The injection molding management system according to claim 7, wherein the distributor is further configured to dry the molding material and distribute the dried molding material to each of the injection molding machines.

11. A control method of an injection molding management system comprising an injection molding management apparatus connected to a plurality of injection molding machines, for performing stock control management of a plurality of types of molding material comprising at least molding materials 1, 2, and 3 used for forming a plurality of kinds of molding in a plurality of injection molding machines comprising at least molding machines 1, 2, and 3 which each form one kind of molding with one or more types of molding material, the injection molding management apparatus comprising at least one processor configured to execute at least a part of the control method comprising:
- storing, for each kind of molding, molding information on usage of each type of molding material used in forming a molding;
- storing a stock quantity of molding material;
- a remaining product quantity calculating step of calculating a remaining product quantity of each kind of molding;
- a total usage calculating step of calculating total usage of each type of molding material used in the plurality of injection molding machines, based on the remaining product quantity and the molding information of each kind of molding;
- an order quantity calculating step of calculating an order quantity of each type of molding material, based on the total usage and the stock quantity of molding material; and
- an order placing step of issuing an ordering command of each type of molding material, based on the order quantity of molding material calculated at the order quantity calculating step, wherein
- in the total usage calculating step, a total usage of each of the molding materials 1, 2, and 3 for each of the injection molding machines 1, 2, and 3 are calculated using the below expressions (I)-(III):

(Total usage of molding material 1)=(Usage of molding material 1 in injection molding machine 1)+(Usage of molding material 1 in injection molding machine 2)+(Usage of molding material 1 in injection molding machine 3);     (I)

(Total usage of molding material 2)=(Usage of molding material 2 in injection molding machine 1)+(Usage of molding material 2 in injection molding machine 2)+(Usage of molding material 2 in injection molding machine 3); and     (II)

(Total usage of molding material 3)=(Usage of molding material 3 in injection molding machine 1)+(Usage of molding material 3 in injection molding machine 2)+(Usage of molding material 3 in injection molding machine 3).     (III)

12. The control method of an injection molding management system according to claim 11, wherein the at least one processor is further configured to store weight of each type of molding material of the molding, a sprue, and a runner, as the molding information.

13. The control method of an injection molding management system according to claim 12, wherein the at least one processor is further configured to store, as the molding information, at least one of a mold cycle time for each kind of molding, a purge condition for each type of molding material, or a good part rate in forming the molding.

14. The control method of an injection molding management system according to claim 13, wherein the at least one processor is further configured to store as the purge condition for each type of molding material, a correction coefficient for the discharge amount of molding material.

15. The control method according to claim 11, the injection molding management system further including:
a delivery period storage unit configured to store the number of days required for delivery of each type of molding material from when the molding material is ordered,
the control method further comprising a usage predicting step of predicting daily usage of each type of molding material used by the injection molding machines, based on the remaining product quantity, a mold cycle time, and the molding information of each kind of molding,
wherein the order placing step is configured to calculate a date on which the stock quantity of molding material reaches a predetermined amount, based on the predicted daily usage of each type of molding material and output the ordering command of placing an order by the number of days for delivery before the date on which the stock quantity of the molding material reaches the predetermined amount.

16. The control method of claim 11, the control method further comprising
an allotment calculating step of calculating an allotment of each type of the molding material to the injection molding machines in accordance with the usage of the molding material used by each of the injection molding machines; and
a distribution step of distributing the molding material to the injection molding machines in accordance with the allotments calculated in the allotment calculating step.

17. The control method according to claim 15, wherein the order placing step is further configured to calculate the date using the equation $D=(S-S')/C-L$ where the stock quantity of molding material is S, a minimum stock quantity of molding material is S', the predicted daily usage is C, the number of days for delivery of the molding material is L, and D is the number of days for delivery before the date on which the stock quantity of molding material reaches the predetermined amount.

18. A control method of an injection molding management system comprising an injection molding management apparatus connected to a plurality of injection molding machines, for performing stock control management of a plurality of types of molding material comprising at least molding materials 1, 2, and 3 used for forming a plurality of kinds of molding in a plurality of injection molding machines comprising at least molding machines 1, 2, and 3 which each form one kind of molding with one or more types of molding material, the injection molding management apparatus comprising at least one processor configured to execute at least a part of the control method comprising:
storing, for each kind of molding, molding information on usage of each type of molding material used in forming a molding;
storing a stock quantity of molding material;
a remaining product quantity calculating step of calculating a remaining product quantity of each kind of molding;
a total usage calculating step of calculating total usage of each type of molding material used in the plurality of injection molding machines, based on the remaining product quantity and the molding information of each kind of molding;
calculating an allotment of each type of the molding material to the injection molding machines in accordance with the usage of the molding material used by each of the injection molding machines;
drying the molding material and distribute the dried molding material to each of the injection molding machines in accordance with the allotments calculated by the allotment calculator; and
an order quantity calculating step of calculating an order quantity of each type of molding material, based on the total usage and the stock quantity of molding material, wherein
in the total usage calculating step, a total usage of each of the molding materials 1, 2, and 3 for each of the injection molding machines 1, 2, and 3 are calculated using the below expressions (I)-(III):

(Total usage of molding material 1)=(Usage of molding material 1 in injection molding machine 1)+(Usage of molding material 1 in injection molding machine 2)+(Usage of molding material 1 in injection molding machine 3);   (I)

(Total usage of molding material 2)=(Usage of molding material 2 in injection molding machine 1)+(Usage of molding material 2 in injection molding machine 2)+(Usage of molding material 2 in injection molding machine 3);   (II)

(Total usage of molding material 3)=(Usage of molding material 3 in injection molding machine 1)+(Usage of molding material 3 in injection molding machine 2)+(Usage of molding material 3 in injection molding machine 3).   (III)

* * * * *